(12) United States Patent
Tessier et al.

(10) Patent No.: US 8,518,151 B2
(45) Date of Patent: Aug. 27, 2013

(54) POROUS HOLLOW FIBER SUPPORTED DENSE MEMBRANE FOR HYDROGEN PRODUCTION, SEPARATION, OR PURIFICATION

(75) Inventors: Pascal Tessier, Wilmington, DE (US); Edgar S. Sanders, Jr., Newark, DE (US); Pascal J. Tromeur, Caluire (FR)

(73) Assignee: L'Air Liquide Societe Anonyme pour l'Etude el l'Exploitation des Procedes Georges Claude, Paris (FR)

( * ) Notice: Subject to any disclaimer, the term of this patent is extended or adjusted under 35 U.S.C. 154(b) by 210 days.

(21) Appl. No.: 13/053,947

(22) Filed: Mar. 22, 2011

(65) Prior Publication Data

US 2012/0067211 A1     Mar. 22, 2012

Related U.S. Application Data

(60) Provisional application No. 61/317,191, filed on Mar. 24, 2010.

(51) Int. Cl.
*B01D 53/22* (2006.01)
*B01D 71/02* (2006.01)
*B01D 69/08* (2006.01)

(52) U.S. Cl.
USPC ............ 95/55; 95/56; 96/10; 96/11; 422/187; 422/617; 423/648.1; 423/651; 423/655

(58) Field of Classification Search
USPC ....... 96/4, 8, 10, 11; 95/45, 55, 56; 422/187, 422/608, 617; 423/418.2, 437.2, 648.1, 651, 423/655
See application file for complete search history.

(56) References Cited

U.S. PATENT DOCUMENTS

| | | | |
|---|---|---|---|
| 4,377,409 A | 3/1983 | Ishibe | |
| 5,205,841 A * | 4/1993 | Vaiman | 96/10 |
| 5,810,912 A | 9/1998 | Akiyama et al. | |
| 6,152,987 A | 11/2000 | Ma et al. | |
| 6,461,408 B2 * | 10/2002 | Buxbaum | 95/55 |
| 6,964,697 B2 * | 11/2005 | Pan et al. | 96/10 |
| 7,175,694 B2 | 2/2007 | Ma et al. | |
| 8,002,875 B1 * | 8/2011 | Bossard | 95/55 |
| 8,070,860 B2 * | 12/2011 | Vanderspurt et al. | 96/11 |
| 2004/0244583 A1 * | 12/2004 | Ma et al. | 95/55 |
| 2005/0241477 A1 * | 11/2005 | Mundschau et al. | 95/56 |
| 2010/0018394 A1 | 1/2010 | Ekiner et al. | |
| 2010/0307333 A1 * | 12/2010 | Zhou et al. | 95/56 |

OTHER PUBLICATIONS

Chiba, Y., "Development of a High-Speed manufacturing Method for Electroplated Diamond Wire Tools", CIRP Annals—Manufacturing Technology, vol. 52, Issue 1, 2003, pp. 281-284.
Lie, Yun et al., "Kinetics of the Water-Gas Shift Reaction Over A rhodium-Promoted iron-Chromium Oxide Catalyst", Chemical Engineering Journal, vol. 114, 2005, p. 81-85.
Hatim, M.D., et al., Pd/Al2O3 Composite Hollow Fibre Membranes: Effect of Substrate Resistances on H2 Permeation Properties, Chemical Engineer Science, vol. 66, 2011, pp. 1150-1158.
Israni, Sameer H., et al., "Hydrogen Generation and Purification in a Composite Pd Hollow Fiber Membrane Reactor: Experiments and Modeling", Catalysis Today, vol. 139, 2009, pp. 299-311.

* cited by examiner

*Primary Examiner* — Jason M Greene
(74) *Attorney, Agent, or Firm* — Christopher J. Cronin

(57) ABSTRACT

A dense hydrogen-permeable layer, such as palladium or palladium alloy, is deposited on a porous hollow fiber. A porous hollow fiber is defined as having an inner diameter of approximately 30 microns to approximately 1500 microns and an outer diameter of approximately 100 microns to approximately 2000 microns. This allows an order-of-magnitude increase in the surface per volume ratio in a hydrogen separation or purification module, or a membrane reformer or reactor.

3 Claims, 3 Drawing Sheets

POROUS HOLLOW FIBER SUPPORTED DENSE MEMBRANE FOR HYDROGEN PRODUCTION, SEPARATION, OR PURIFICATION

The present application claims priority to U.S. Provisional Patent Application No. 61/317,191 filed Mar. 24, 2010, the entire contents incorporated herein.

FIELD OF THE INVENTION

The present invention relates to a porous hollow fiber that can be utilized in a hydrogen separation or purification module, or in a membrane reformer or reactor, the porous fiber membrane having an inner diameter of from approximately 30 microns to approximately 1500 microns and an outer diameter of from approximately 100 microns to approximately 2000 microns and providing an order-of-magnitude increase in the surface per volume ratio.

BACKGROUND

Today most hydrogen is commercially produced by the method of steam methane reforming, where natural gas stripped of its sulfur content is mixed with steam and passed through heated tubes filled with catalyst to yield a mixture of hydrogen and carbon monoxide. The level of carbon monoxide produced is typically decreased by further converting the carbon monoxide to carbon dioxide through reaction of the carbon monoxide with steam in a water gas shift reactor to yield a hydrogen/carbon dioxide mixture. Pure hydrogen is separated from the resulting hydrogen/carbon dioxide mixture in a pressure swing adsorption unit.

There are a variety of drawbacks associated with using the above method, including, but not limited to, the production of steam produced by waste heat boilers used to cool the hydrogen/carbon monoxide mixture from the steam methane reformer reactor to the water gas shift reactor (from approximately 850° C. to approximately 350° C.), the emission of low-pressure carbon dioxide mixed with nitrogen and water vapor, and cost of three process units required for hydrogen production, namely, the steam methane reformer reactor, water gas shift reactor, and pressure swing adsorption unit.

Using a membrane reformer instead of a steam methane reformer reactor and water gas shift reactor reduces the amount of flue gas and carbon dioxide generated in the hydrogen production process and makes heat integration easier. In addition, a membrane reformer produces less—or zero— steam since it does not require cooling syngas from the steam methane reformer reactor (approximately 850° C.) to the water gas shift reactor (approximately 350° C.). This cooling is usually accomplished by passing the hot syngas through a waste heat boiler. In a membrane reformer, both the reforming and shift reactions may be conducted in the same reactor at a temperature of from about 500° C. to about 600° C.

However, with current palladium or palladium alloy-based membrane reformers, the hydrogen product pressure is too low for practical use. The product pressure depends upon the hydrogen partial pressure on the process side, the membrane permeance and surface area, as well as the required hydrogen flow. Current palladium based membranes are deposited on porous tubes, such as alumina or stainless steel, with a typical outer diameter of 5 mm or more. See, e.g. U.S. Pat. No. 7,175,694.

The use of hollow fiber membranes for separation of mixtures of liquids and gases is well developed and commercially very important art. Such membranes are traditionally composed of a polymeric composition through which the components from the mixture to be separated are able to travel at different rates under a given set of driving force conditions, e.g. trans-membrane pressure and concentration gradients. Examples are the desalination of water by reverse osmosis, separation of water/ethanol mixtures by pervaporation, separation of hydrogen from refinery and petrochemical process streams, enrichment of oxygen or nitrogen from air, and removal of carbon dioxide from natural gas streams. In each separation, the membranes must withstand the conditions of the application, and must provide adequate flux and selectivity in order to be economically attractive.

The use of hollow fibers is recognized to have advantages over flat film or planar membranes due to the large membrane surface area for separation within a specific volume of apparatus. The success of polymeric hollow fiber membranes has in part been due to the ability to produce fibers of extremely small diameter—in some cases, the diameter of a human hair (about 80 microns). The ability to utilize small diameter fibers allows for extremely high module surface areas per system volume, which allows for the processing of high volumes of fluid in a smaller system size.

In certain applications where high chemical resistance and operation at high temperature and pressure are desired, such as in a membrane reformer, polymeric membranes have not been suitable for use because of the degradation of membrane performance during operation. Inorganic or ceramic membranes have been successfully made in flat or planar shapes and large cylindrical tubes (>1 cm diameter), but have had limited commercial success because of their relatively low surface area compared to small diameter hollow fiber membranes. Production of small diameter ceramic hollow fibers has been problematic with respect to strength of the precursor fiber (sometimes referred to as a "green" fiber) and the final fiber after sintering.

Such hollow fibers are typically made from a suspension of inorganic particles in a liquid medium with a suitable binder to form a paste, which is subsequently extruded through an annular die to form a precursor hollow fiber. After removal of the liquid dispersion medium, the precursor fiber is sintered at elevated temperature to consolidate the individual particulate structure into a micro-porous structure.

For the production of small diameter inorganic fibers, it has been found to be beneficial to incorporate a polymeric binder in the paste to strengthen the nascent fiber. The polymer is typically soluble in the liquid medium of the paste. After the paste is extruded to form a nascent hollow fiber, the polymer solution in the interstices between the inorganic particles is coagulated to solidify the polymer by passing the nascent fiber into a liquid bath containing a coagulating fluid. Alternatively, the liquid can be removed by evaporation to solidify the polymer. The resulting polymeric/inorganic precursor fiber has considerably greater strength and ductility than exhibited in the absence of a polymeric binder.

SUMMARY OF THE INVENTION

Disclosed are hollow fiber membranes comprising a porous support having an inner diameter of approximately 30 microns to approximately 1500 microns, an outer diameter of approximately 100 microns to approximately 2000 microns, and a hydrogen selective dense layer coated on the outer diameter. The disclosed membranes may include one or more of the following aspects:

the porous support being ceramic;
the porous support being metallic;
the porous support being stainless steel;

the hydrogen selective dense layer being selected from the group consisting of palladium, vanadium, tantalum, niobium, cermet, and mixtures thereof; and the palladium hydrogen-selective dense layer comprising either palladium or a palladium alloy.

Also disclosed herein are purification modules comprising a casing through which are located a feed gas port, a non-permeate outlet port, and a permeate outlet port; and hollow fiber membranes disposed within the casing and comprising a porous support having an inner diameter of approximately 30 microns to approximately 1500 microns, an outer diameter of approximately 100 microns to approximately 2000 microns, and a hydrogen selective dense layer coated on the outer diameter. The disclosed purification modules may include one or more of the following aspects:

a catalyst disposed within the casing;
the purification module being a membrane reformer; and
a sweep gas port through casing.

Also disclosed is a method of removing hydrogen from a hydrogen containing gas mixture. The steps of the method may be performed simultaneously. In the first step, a hydrogen-containing gas mixture is obtained. The hydrogen-containing gas mixture is contacted with a hollow fiber membrane comprising a porous support having an inner diameter of approximately 30 microns to approximately 1500 microns, an outer diameter of approximately 100 microns to approximately 2000 microns, and a hydrogen-selective dense layer coated on the outer diameter. A high purity hydrogen stream is recovered from the permeate side of the membrane and a hydrogen-lean stream is recovered from the non-permeate side of the membrane. The disclosed method may include one or more of the following aspects:

feeding a sweep gas to the permeate side of the membrane;
the hydrogen containing gas mixture also containing carbon monoxide, carbon dioxide, methane, and water;
the contacting occurring in the membrane reformer; and
the contacting occurring in a water gas shift reactor.

DESCRIPTION OF PREFERRED EMBODIMENTS

Figure 1:
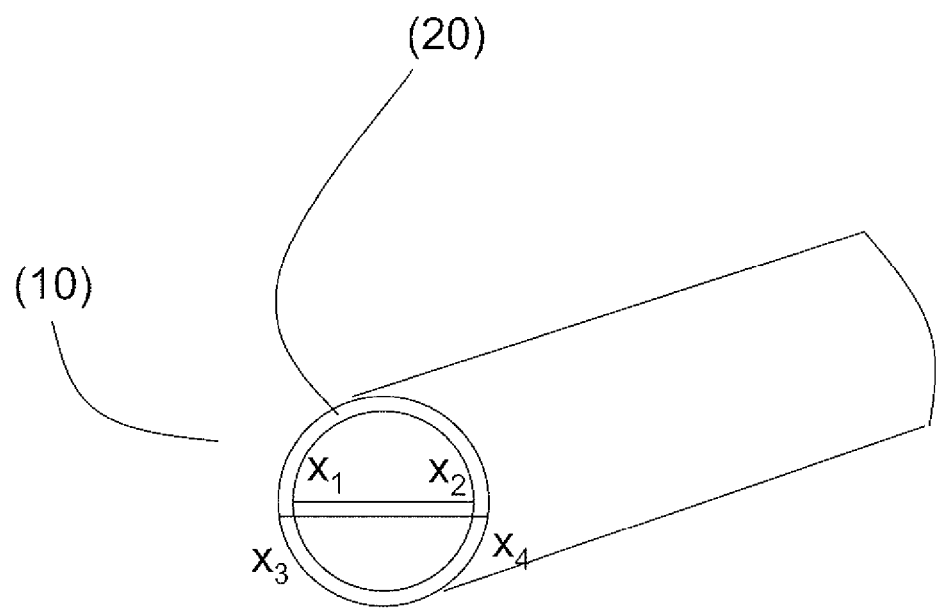
FIG. 1 is an isometric view of the disclosed porous hollow fiber membrane having a hydrogen-selective palladium dense layer deposited thereon.

The present invention comprises porous hollow fiber membranes having a hydrogen selective dense layer thereon and methods of making and using the same. By using porous hollow fibers as the support for the highly selective hydrogen permeable dense layer, it is possible to increase the surface/volume ratio of a hydrogen separation or purification module or a membrane reformer or reactor considerably.

The hollow fiber membrane comprises a porous support that is in the form of hollow fibers. Each of the hollow fibers has a hydrogen selective dense layer coated on the outer diameter of each of the hollow fibers. As noted previously, the hollow fibers are of a certain size which in turn allows for increased surface/volume ratio of a hydrogen separation or purification module. More specifically, with regard to the present invention, the disclosed hollow fibers have an inner diameter that ranges from approximately 30 microns to approximately 1500 microns and an outer diameter that ranges from approximately 100 microns to approximately 2000 microns. Preferably, the disclosed hollow fibers have an inner diameter that ranges from approximately 50 microns to approximately 1100 microns and an outer diameter that ranges from approximately 750 microns to approximately 1500 microns.

A variety of different porous supports may be used for the membranes of the present invention. More specifically, in one embodiment of the present invention, the porous support utilized for the disclosed membrane can be any existing ceramic hollow fibers, such as those described in U.S. Pat. No. 5,810,912 to Akiyama et al or U.S. Patent Application Publication No. 2010/0018394 to Ekiner et al, the methods of producing the porous ceramic hollow fibers disclosed therein being incorporated herein by reference.

In a second embodiment of the present invention, the porous support utilized for the disclosed membrane can be any porous metallic hollow fibers (for example, porous stainless steel or inconel hollow fibers) that are made by extrusion of a metal powder based paste or slurry, such techniques of powder metallurgy being known to those skilled in the art, or that are made by the process as disclosed in U.S. Patent Application Publication No. 2010/0018394 to Ekiner et al.

With regard to either of these embodiments, the porous hollow fiber is used as a support for the hydrogen selective dense layer. The porous hollow fibers may or may not incorporate additional separation materials as a part of the porous hollow fiber. For example, as disclosed in U.S. Patent Application Publication No. 2010/0018394 to Ekiner et al, the porous hollow fiber may further comprise palladium as a part of the porous hollow fiber, this combination porous hollow fiber then being coated with a hydrogen selective dense layer as disclosed herein. Alternatively, the porous hollow fiber may serve simply as a support with no other components therein that affect the diffusion of the gases in the gas stream to be treated.

In a still further embodiment, the disclosed porous hollow fiber membranes may incorporate an intermediate layer between the hollow fibers and the hydrogen selective dense layer. For example, if a metallic hollow fiber is used, an intermediate layer of ceramic material may be formed by oxidation of a metal of the metallic hollow fiber in an oxidation-reduction reaction with oxygen, nitrogen, or carbon on the outer diameter of the metallic hollow fiber to prevent reaction between the hollow fiber and the hydrogen-selective dense layer. Such intermediate layers are described for example in U.S. Pat. No. 6,152,987 to Ma et al., the teachings of which are incorporated herein by reference.

With regard to the previous embodiments, a hydrogen-selective dense layer may then be deposited on the outer diameter of the porous hollow fibers or, when applicable, on the intermediate layer that is to separate the hollow fibers and the hydrogen selective dense layer. The hydrogen selective dense layer may be selected from the group consisting of palladium, vanadium, tantalum, niobium, and cermet, mixtures of two or more of palladium, vanadium, tantalum, niobium, and cermet, as well as compounds, alloys, and composites that include one or more of palladium, vanadium, tantalum, niobium, and cermet. For example, pure palladium may be used as the hydrogen selective dense layer. Alternatively, the hydrogen selective dense layer may be a palladium-containing alloy, such as Pd—Ag, Pd—Au, or Pd—Cu. For example, the palladium-containing alloy may include a palladium and copper mixture ranging from approximately 50% mol/mol to approximately 85% mol/mol palladium and approximately 15% mol/mol to approximately 50% mol/mol copper.

As used herein, the phrase "dense" means that the hydrogen selective layer is non-porous and only permeable to hydrogen. As a result, unlike other prior art polymeric membranes that produce permeate streams rich in one component and lean in the other components of the feed stream, the disclosed membrane is capable of producing a pure hydrogen permeate stream. The ideal thickness of the hydrogen selective dense layer is approximately 1 micron to approximately 10 microns, preferably approximately 3 microns to approximately 8 microns. In addition, preferably, the resulting dense layer is without defects, such as pinholes, voids, or cracks as such defects would possibly allow the permeation of other components along with the hydrogen.

The hydrogen selective dense layer may be deposited in any number of manners that are known in the art, including but not limited to, electroless plating or electrolytic plating. For example, in electroless plating of palladium, the exterior surface of porous hollow fiber may be cleaned in an ultrasonic bath or alkaline solution and rinsed sequentially by tap water, deionized water and isopropanol. The surface of the porous hollow fiber may be oxidized by heat treatment in oxygen, for example at about 900° C. and activated in baths of $SnCl_2$ and $PdCl_2$. These steps are followed by electroless plating, where the fiber is immersed in a solution such as 4 g/l $Pd(NH_3)_4Cl_2.H_2O$, 198 ml/l $NH_4OH$ (28%), 40.1 g/l $Na_2EDTA$, and 6 ml/l $H_2NNH$ (1M). The cleaning, rinsing, oxidizing, and plating procedures may be repeated one or several times at any step of the process. Duration and temperature of each step of the process described above may be varied as required and deemed desirable by those skilled in the art. Such electroless plating procedure is known in the art and described for example in U.S. Pat. No. 6,152,987 to Ma et al.

The hydrogen selective dense layer may also be deposited on the fibers described above using high-speed electroplating as set forth in Chiba et al., Development of a High-speed Manufacturing Method for Electroplated Diamond Wire Tools.

The disclosed methods allow for the production of the hydrogen selective dense layers on porous hollow fiber supports. The use of porous hollow fibers instead of large outer diameter (5 mm or more) tubes considerably increases the surface/volume ratio, thus increasing the flow of a given hydrogen partial pressure differential across the membrane or increasing the permeate pressure for given feed pressure and required hydrogen flow rate.

Large numbers of such porous hollow fiber membranes having hydrogen selective dense layers deposited thereon may be assembled in various types of hydrogen separation and purification modules or bundles, as well as in membrane reformers or reactors also containing catalysts and heat supply or extraction systems such as heat exchangers or burners.

Alternatively, large numbers of porous hollow fiber modules may be assembled in modules or bundles, and then covered with a thin, dense layer of palladium, thus allowing the simultaneous deposition of Pd on a large number of fibers at a very low cost and short time.

For a further understanding of the nature and objects of the present disclosure, reference is made to the figures contained herein which should be considered in view of the following detailed description in which like elements are given the same or analogous reference numbers. These figures are not meant to be limiting with regard to the present invention. FIG. 1 is an isometric view of the disclosed porous hollow fiber membrane 10 of the present invention having a hydrogen-selective dense layer 20 thereon. As shown, the inner diameter of the porous hollow fiber membrane 10 is approximately 30 microns to approximately 1500 microns, as depicted by line $x_1$ to $x_2$. The outer diameter of the porous hollow fiber membrane 10 is approximately 100 microns to approximately 2000 microns as depicted by line $x_3$ to $x_4$. In this particular embodiment, a very thin layer of the hydrogen selective dense layer 20 is deposited on the porous hollow fiber membrane 10.

The disclosed membrane may be utilized to purify the hydrogen containing gas stream from a stream methane reformer, gasification reactor, water gas shift reactor, or in combination with a suitable reactor/catalyst system to enhance feedstock conversion by removing the hydrogen product in situ from any combination of these reactors. For example, the disclosed membrane may be utilized in a purification module for the recovery of high purity gaseous hydrogen and a high pressure carbon dioxide rich stream (from 15 to 90 bar, preferably from 28 to 50 bar).

Figure 2:
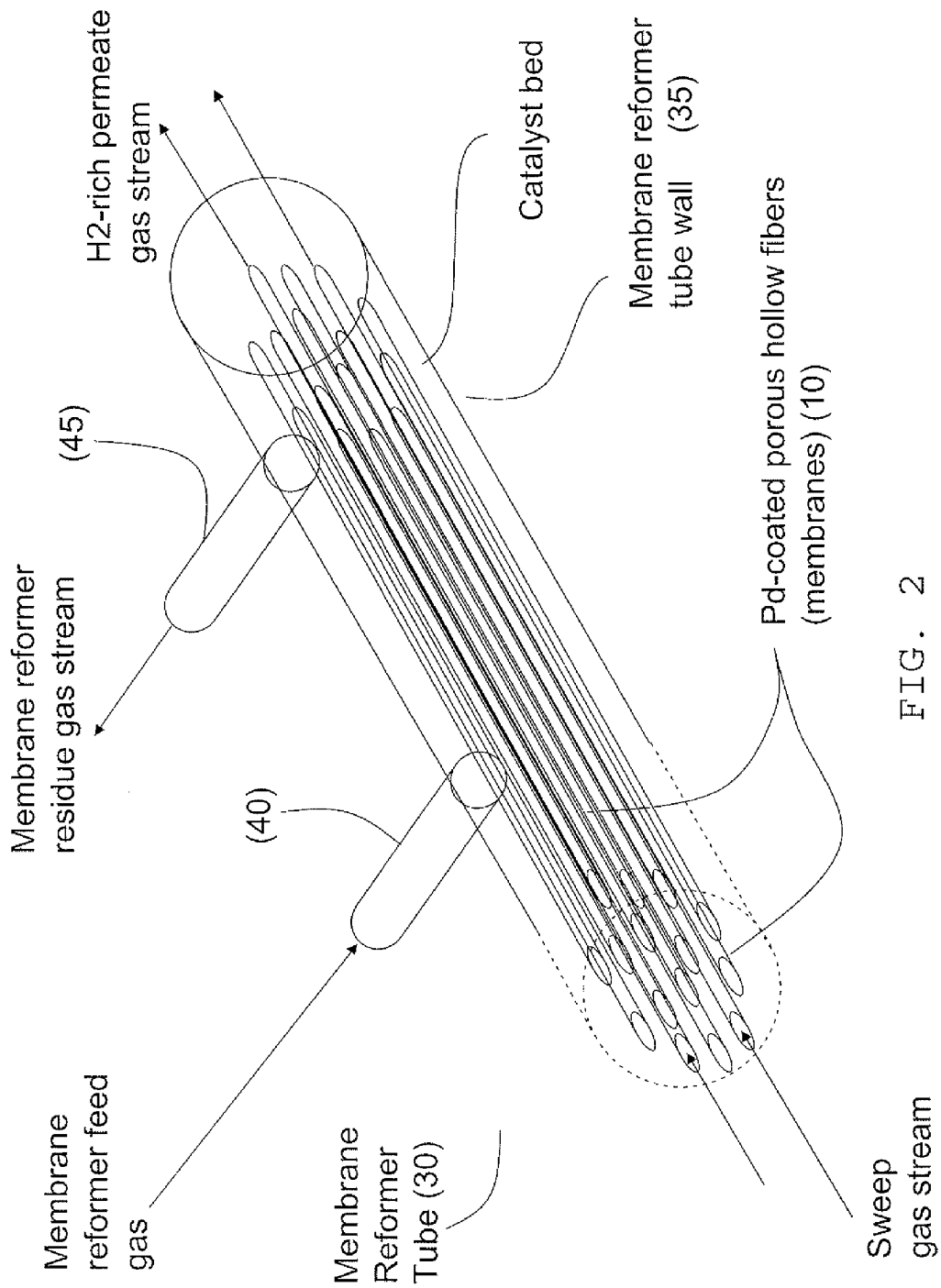
FIG. 2 is an isometric view of a separation module.

FIG. 2 is an isometric view of one embodiment of a purification module. The tubular casing 30 of a purification module includes a wall 35 forming a chamber containing the disclosed hollow fiber membranes 10. The wall 35 includes a feed gas port 40, a non-permeate stream port 45, a permeate stream port (not shown), and an optional sweep gas port (not shown). Although depicted in FIG. 2 as cylindrically shaped, one of ordinary skill in the art will recognize that the membrane reformer tube 30 may be any suitable shape, such as for example, oval, square, rectangle, octagon, etc.

The tubular casing 30 may further include a catalyst (not shown), which may be contained within the wall 35 or coated on the hollow fiber membrane 10. When performing a chemical reaction, whether or not it comprises a catalyst, the tubular casing 30 is also a membrane reactor. The tubular casing 30 may also comprise one or more sources of heat (not shown), such as tubes where a hot gas stream is passed, or heating devices such as a burners or electric heaters. Alternatively, the tubular casing 30 may be contained in a heated enclosure allowing heat transfer into said tubular casing 30. In the case of an exothermic reaction, the tubular casing 30 may comprise one or more cooling devices (not shown) or be contained in a cooling enclosure or system.

Figure 3:
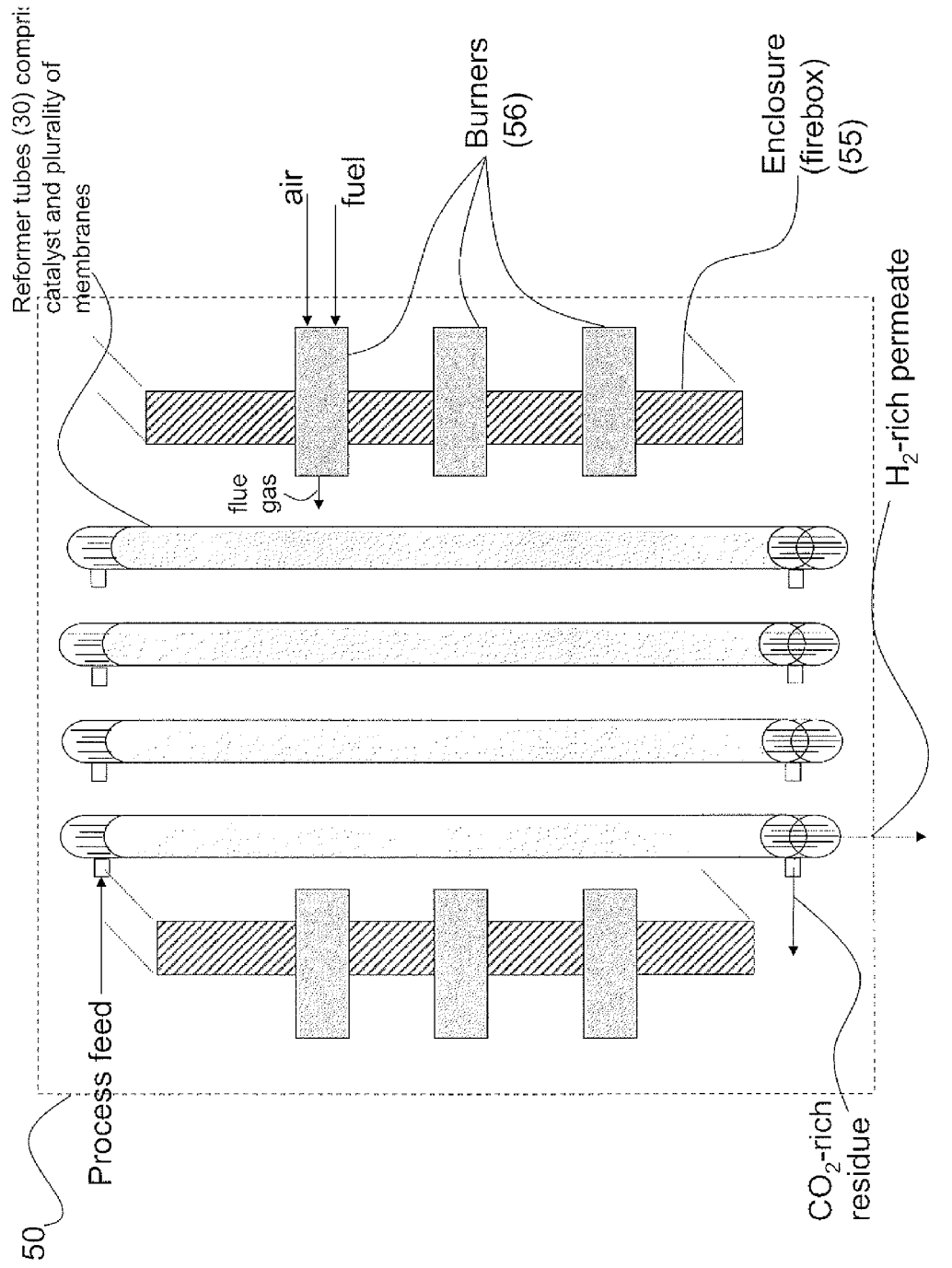
FIG. 3 is a top view of a membrane reactor.

FIG. 3 is a top view of one embodiment of a membrane reactor according to the present invention. As depicted, the membrane reactor 50 contains four tubular casings, which in this case are also reformer tubes 30. One of ordinary skill in the art will recognized that alternate numbers of membrane reformer tubes 30 may be utilized without departing from the teachings herein. As used herein, the phrase "membrane reactor" or "membrane reactor unit" refers not only to the membrane reactor, but also to all of the additional components that typically are considered to make up a membrane reactor, including, but not limited to, one or more components selected from heat exchangers, the reformer, tubes with one or more types of catalyst, etc.

The membrane reactor 50 includes a firebox enclosure 55 and multiple burners 56. One or more desulfurized hydrocarbon streams, such as desulfurized natural gas, and steam are introduced through one or more of the burners 56 into a membrane reactor 50, thereby producing hydrogen and carbon dioxide. Feedstock other than desulfurized natural gas may also be utilized in the membrane reactor 50, such as for example, naphta.

In addition to the embodiments depicted in FIG. 2 and FIG. 3, the membrane reactor may comprise a large number of hollow fiber dense hydrogen selective membranes assembled in various types of hydrogen separation and purification modules either alone or in conjunction with the more traditional types of reactors that contain one or more tubes containing catalysts and one or more heat supply or extraction systems such as heat exchangers or burners. In one embodiment, the disclosed membrane may further comprise a layer of catalyst on top of the hydrogen selective dense layer in order to prevent damage to the hydrogen selective dense hollow fiber membrane, for example from contact with catalyst supports. Such catalyst layers over the hydrogen selective dense layer may completely replace other supported catalysts used in the reactors disclosed in the prior art.

Prior to being introduced into the membrane reactor, the one or more desulfurized hydrocarbon streams may be compressed or may be obtained already pressurized, e.g. to a pressure from about 200 psig to about 700 psig, and combined with high pressure steam, which is at about 700 psig. In the membrane reactor, an elevated temperature between approximately 500° C. and approximately 700° C. is typically maintained to drive the endothermic reaction, for example $CH_4 + H_2O \rightarrow CO + 3H_2$. Heat for the reforming reaction is provided by burning fuel, such as natural gas or the flammable components of the carbon dioxide rich residue. The reaction product from the membrane reactor unit is principally a hydrogen rich effluent that contains hydrogen, carbon monoxide, methane, water and carbon dioxide in proportions close to equilibrium amounts at the elevated temperature and pressure.

The hydrogen from the hydrogen rich effluent permeates through the disclosed hydrogen permeable membrane, thus providing a pure hydrogen stream or a hydrogen rich stream if a sweep gas is used. A sweep gas such as steam may be fed to the permeate "side" of the membrane to lower the partial pressure of hydrogen permeating through the membrane from the hydrogen rich effluent. One of ordinary skill in the art will recognize that the permeate "side" of a membrane does not necessarily mean one and only one side of a membrane. Rather, the permeate "side" actually is considered to be the plurality of sides of the individual hollow fibers that are opposite to the sides to which the hydrogen rich effluent is introduced. The non-permeate stream from the membrane separation process of membrane reactor may be sent to a carbon dioxide purification unit.

A membrane reactor or membrane reformer performs in a single unit the reactions and separations requiring three units in a conventional hydrogen production plant: steam methane reforming, water gas shift, and pressure swing adsorption. The reason for the high conversion rate of methane and carbon monoxide at moderate temperature (from about 500° C. to about 600° C.) in the membrane reactor is due to the continuous extraction of the hydrogen product by permeation through the Pd-based membrane(s).

Alternatively, the disclosed membrane may be utilized in a water gas shift reactor to convert carbon monoxide to carbon dioxide, while liberating additional hydrogen by reaction at high temperature in the presence of the additional steam ($CO + H_2O \rightarrow H_2 + CO_2$). When high amounts of carbon monoxide are contained in the hydrogen rich effluent from a conventional reformer (not using membranes) a water gas shift reactor may be used to form additional hydrogen and carbon dioxide by further reacting or treating the hydrogen rich effluent stream with additional steam in order to obtain a water gas shift effluent.

A water gas shift reactor is typically a vessel containing a water gas shift catalyst, such as $Fe_3O_4$—$Cr_2O_3$ (see Lei et al. Chemical Engineering Journal 114 (2005) 81 to 85). A membrane water gas shift reactor is similar but incorporates, in addition, membrane tubes or fibers of the present invention, preferably throughout the entire volume of the reactor, that extract the hydrogen produced by the water gas shift reaction.

The hydrogen rich effluent from a conventional reformer still contains or is mixed with additional steam in the water gas shift reactor at a temperature ranging between approximately 200° C. and approximately 450° C., thereby producing additional hydrogen and carbon dioxide. Hydrogen in the water gas shift product stream permeates through the disclosed hydrogen permeable membrane, thus providing a pure hydrogen stream or a hydrogen rich stream if a sweep gas is used. As in the membrane reformer, the non-permeate stream from the membrane separation process of the water gas shift reactor can be sent to a carbon dioxide purification unit.

The above processes allow recovery of high purity gaseous hydrogen from a hydrogen containing gas mixture. While described in a step-wise fashion, one of ordinary skill in the art will recognize that the disclosed steps may occur concurrently and be performed in different combinations of reactors and separation units without departing from the disclosed method.

The hydrogen containing gas mixture may be generated by a stream methane reformer, gasification reactor, water gas shift reactor, or any other process that provides a hydrogen containing stream. The hydrogen containing gas mixture is contacted with the disclosed hollow fiber membrane. The difference in hydrogen partial pressure drives the permeation of hydrogen through the membrane. At a specific point on the membrane, the hydrogen flow rate is best modeled as being equal to the permeance multiplied by the membrane surface area multiplied by the difference of the square root of the hydrogen feed partial pressure and the square root of the hydrogen permeate partial pressure, as shown by the following formula:

$$Q = P \cdot S \cdot (P_{H2,feed}^{1/2} - P_{H2,permeate}^{1/2})$$

Wherein Q is the hydrogen molar flow rate, P, the permeance, S the membrane surface, $P_{H2,feed}$ the hydrogen partial pressure in the feed, and $P_{H2,permeate}$ the hydrogen partial pressure in the permeate. The current invention is not dependent on the accuracy of this model or the conformity of a specific membrane to this model.

A high purity hydrogen stream is recovered from the permeate side of the membrane, mixed with a sweep gas if a sweep gas is used, and a hydrogen lean stream is recovered from the non-permeate side.

As described above, in all of the disclosed embodiments, a sweep gas may be used to increase the driving force for hydrogen permeation. A sweep gas (other than hydrogen itself) will reduce the hydrogen partial pressure on the permeate side as the flow of the sweep gas is increased, for a given pressure. A variety of sweep gases, such as steam or nitrogen may be used. It is preferable to use a sweep gas which can be easily condensed by cooling, making it easy to separate a pure hydrogen stream.

Additionally, the disclosed method may be utilized to recover high purity hydrogen multiple times in one process. For example, the hydrogen rich effluent from a membrane separator may be contacted with the disclosed membrane to produce high purity gaseous hydrogen on the permeate side. The hydrogen lean stream from the non-permeate side may be treated in a water gas shift reactor to produce a water shift effluent. The water gas shift effluent may also be contacted with the disclosed hollow fiber membrane to produce a high purity hydrogen permeate stream and a hydrogen lean non-permeate stream.

In all of these alternatives, the disclosed membranes eliminate the need for the hydrogen pressure swing adsorption unit commonly used to purify the hydrogen in product stream from the membrane and water gas shift reactors. Additionally, the disclosed membranes are capable of producing purified hydrogen (greater than 99% hydrogen, and preferably greater than 99.9% hydrogen) from the warm product of the membrane and/or water gas shift reactor without a requirement to cool down the hydrogen rich effluent, as is required for pressure swing adsorption treatment.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

LISTING OF ELEMENTS 10 porous hollow fiber membrane
20 hydrogen-selective dense layer
30 tubular casing (membrane reformer tube)
35 wall
40 feed gas port
45 non-permeate stream port
50 membrane reactor
55 firebox enclosure
56 multiple burners
$x_1$ to $x_2$ inner diameter of the porous hollow fiber membrane
$x_3$ to $x_4$ outer diameter of the porous hollow fiber membrane

What is claimed is:

1. A method of removing hydrogen in situ from a reactor or catalyst system producing hydrogen, the method comprising the steps of:

contacting a hollow fiber membrane with a reaction gas mixture, the membrane comprising a porous stainless steel support having an inner diameter of approximately 30 microns to approximately 1500 microns, an outer diameter of approximately 100 microns to approximately 2000 microns, an intermediate layer of ceramic coated on the stainless steel support, and a hydrogen selective dense layer coated on the outer diameter, the reaction gas mixture comprising either methane and steam or carbon monoxide and steam;

recovering a high purity hydrogen stream from a permeate side of the membrane; and recovering a hydrogen-lean stream from a non-permeate side of the membrane.

2. The method of claim 1, wherein the hydrogen-selective dense layer is selected from the group consisting of palladium, vanadium, tantalum, niobium, and cermet, mixtures of two or more of palladium, vanadium, tantalum, niobium, and cermet, as well as compounds, alloys, and composites that include one or more of palladium, vanadium, tantalum, niobium, and cermet.

3. The method of claim 2, wherein the palladium hydrogen-selective dense layer comprises either palladium or a palladium alloy.

* * * * *